Aug. 26, 1958

A. B. PRZEDPELSKI 2,849,604

PANORAMIC RECEIVER

Filed Feb. 14, 1957

2 Sheets-Sheet 1

Inventor
Andrzej B Przedpelski
By:
Graf, Nierman & Burmeister
Attorney

Inventor
Andrzej B. Przedpelski
By:
Graf, Nierman & Burmeister
Attorney

United States Patent Office 2,849,604

Patented Aug. 26, 1958

2,849,604

PANORAMIC RECEIVER

Andrzej B. Przedpelski, Forest Park, Ill., assignor to A. R. F. Products, Inc., River Forest, Ill., a corporation of Illinois Application February 14, 1957, Serial No. 640,251

7 Claims. (Cl. 250—20)

The present invention relates to panoramic receivers and to variable inductors suitable for use in panoramic receivers.

In recent years, a class of magnetic materials known as "ferrites" has been developed. Ferrites are a part of the family of semiconductors, and exhibit the property of substantial magnetic permeability with substantial electrical resistance. As a result, ferrites are particularly useful as cores for inductors, particularly for the higher frequencies. The inductance of such an inductor may be changed by conducting a magnetic flux through the ferrite core, thereby changing the incremental permeability of the core. Hence, an inductor with an inductance variable by a change in electrical current may be constructed by combining a ferrite cored coil with an electromagnet, since the change in the current supplied to the electromagnet will change the inductance of the ferrite cored coil.

Panoramic receivers require tuned circuits which are swept periodically over a particular frequency range, and thus require tuned circuits which are capable of being swept over a particular frequency range. In order to construct a panoramic receiver of suitable sensitivity and selectivity, it is necessary to sweep a plurality of tuned circuits, thus requiring tracking of these tuned circuits.

In the past, attempts to construct variable inductors by combining a ferrite cored inductance and an electromagnet have been costly, particularly for applications in which a plurality of variable inductors must be ganged. It is therefore one of the objects of the present invention to provide a variable inductor employing a ferrite cored coil and an electromagnet which is substantially cheaper to construct and requires less precision.

It is a further object of the present invention to provide a variable inductor employing a ferrite cored coil and an electromagnet which may readily be tracked over a frequency range.

In addition, it is an object of the present invention to provide a panoramic receiver employing a plurality of variable inductors having ferrite cored coils in combination with electromagnets connected in a novel circuit.

These and additional objects of the present invention will be more fully understood from a further reading of this disclosure, particularly when viewed in the light of the drawings, in which.

Figure 2:
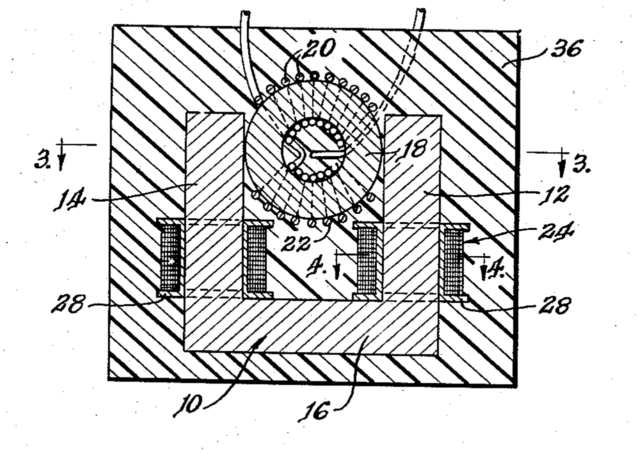
Figure 2 is a sectional view of a variable inductor constructed according to the teachings of the present invention.
Figure 3:
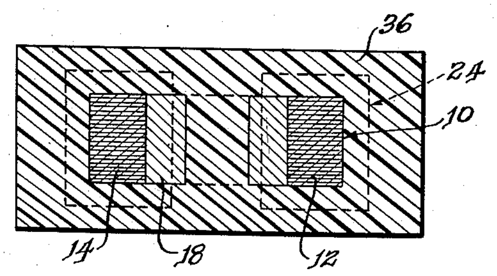
Figure 3 is a sectional view taken along the line of 3—3 of Figure 2.
Figure 4:
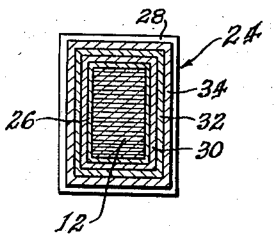
Figure 4 is a sectional view taken along the line 4—4 of Figure 2.

Figures 2, 3 and 4 illustrate a variable inductor constructed according to the present invention. In this inductor, a U-shaped ferromagnetic core 10 has a pair of parallel legs 12 and 14 extending from a central portion 16. The core 10 is constructed of iron laminations in the conventional manner. A ring 18 with a rectangular cross section constructed of ferrite is disposed between the legs 12 and 14 of the core 10 and abuts these legs. The axis of the ring 18 is essentially normal to the plane of the core 10. A pair of half toroids 20 and 22 are wound about the ring 18, one on each half of the ring between the legs 12 and 14, and these toroids 20 and 22 are connected in series to form the coil of the variable inductor.

A coil assembly 24 is disposed about each of the legs 12 and 14, the assemblies 24 being identical. Each of the coil assemblies 24 includes a bobbin 26, or form, constructed of electrically insulating paramagnetic material, such as nylon, with a rectangular cross section fitting snugly about the leg of the core 10. The bobbin 26 also has a pair of spaced flanges 28 which extend outwardly from the core 10 to form walls to confine coils of wire therebetween. Three coils 30, 32, and 34 are wound in successive layers about the bobbin 26. These coils are electrically insulated from each other. The core 10, coil assemblies 24, and ring 18 are enclosed in the mass 36 of potting compound to form a hermetically sealed unit, leads from the coils extending outwardly through the potting compound.

Actually, it is only necessary to provide three coils about the core 10 rather than the six illustrated, and the location of the coils about the core 10 is not critical, nor need they be in a single assembly. One of the three coils is to be used to receive the variable current to control the inductance of the toroids 20 and 22. A second of the three coils is to be subjected to a direct current bias for purposes of establishing the low frequency tracking point of the variable inductor. The third of these coils is to receive the same current as the control coil for purposes of establishing the high frequency tracking point, as will be more fully hereinafter described. The six coils are therefore interconnected in pairs, either in series or parallel. There is, however, an advantage in employing two coil assemblies with three windings on each and interconnecting the six windings in pairs, in that the number of turns in each coil assembly is reduced by a factor of two causing the outer coil 34 to be sufficiently close to the core 10 to contribute approximately the same amount of flux per unit of current therethrough as the other two coils 30 and 32.

The inductance disposed about the ferrite ring 18 is also illustrated as a pair of half toroids 20 and 22, although a single toroid could be employed. However, there is again an advantage in employing a pair of half toroids since the two half toroids are easier to wind upon the ring 18 leaving sufficient space for the ring 18 to abut the core 10 than a single toroid.

It is to be noted that the contact between the ring 18 and the legs 12 and 14 of the core 10 is essentially a line contact rather than a surface contact. As a result, the ring 18 may readily be fitted between the legs 12 and 14, since the diameter of the ring may readily be reduced to fit between the legs 12 and 14. Heretofore, it has been believed that the junction between the ferrite core and the magnetic core should avoid air gaps as far as possible, thus necessitating carefully machined joints. However, due to the fact that the permeability of the ferrite core at saturation approaches that of air, it is unnecessary to eliminate air gaps and to make tight fitting junctions between the ferrite core and the magnetic core.

Figure 1:
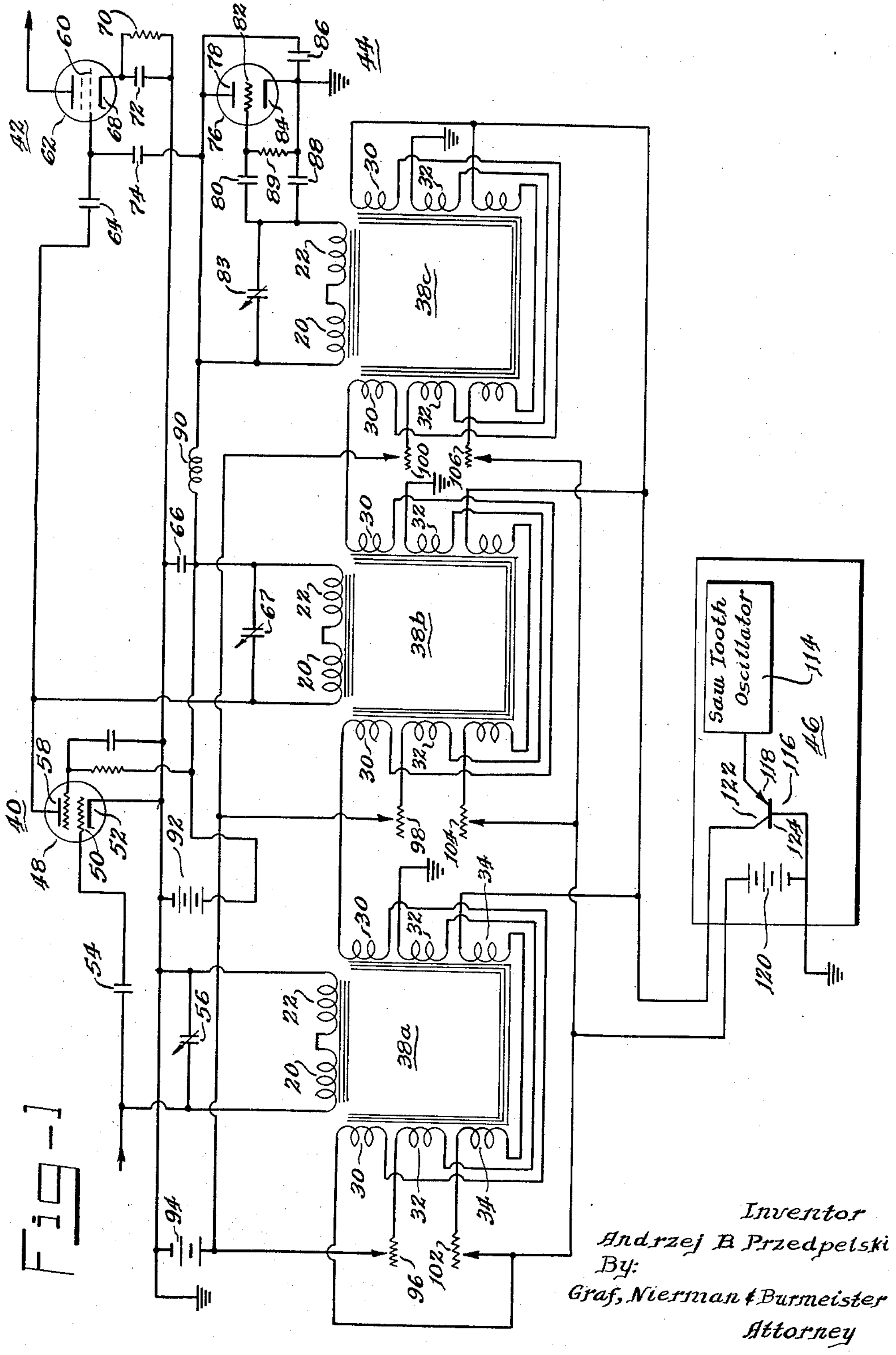
Figure 1 is a fragmentary schematic view of a panoramic receiver constructed according to the teachings of the present invention.

Figure 1 illustrates the variable inductor of Figures 2 through 4 employed in a panoramic receiver, three of the variable inductors being employed and designated 38*a*, 38*b*, and 38*c*. The panoramic receiver is fragmentarily illustrated, the radio frequency amplifier 40, mixer 42, oscillator 44, and sweep generator 46 being shown. The other elements of the panoramic receiver are conventional, and hence have not been illustrated. The radio frequency amplifier 40 employs a vacuum tube 48 with a control grid 50 which is connected to a cathode 52 through the serially connected half toroids 20 and 22 of the first variable inductor 38*a* and a capacitor 54. The cathode 52 is also connected to a common ground connector. This grid 50 also receives the receiver input, as from an antenna in a conventional manner. A padding capacitor 56 is also connected in parallel with the half toroids 20 and 22.

Vacuum tube 48 has a plate 58 which is coupled to the grid 60 of a mixer tube 62 by a capacitor 64. The half toroids 20 and 22 of the second variable inductor 38*b* are connected in series with a capacitor 66 between the plate 58 of vacuum tube 48 and the ground connector. Also, a trimming condenser 67 is connected in parallel with the half toroids 20 and 22. Vacuum tube 62 also has a cathode 68 connected to the ground connector through the bias resistor 70 and capacitor 72. The oscillator 44 is coupled to the grid 60 of vacuum tube 62 through a capacitor 74, and the oscillator 44 has a vacuum tube 76, connected in a Colpitts oscillator circuit. The capacitor 74 is connected directly to the plate 78 of vacuum tube 76, and the half toroids 20 and 22 of variable inductor 38*c* are connected in series with a capacitor 80 between the plate 78 and the control grid 82 of the tube 76. A trimming condenser 83 is connected in parallel with the half toroids 20 and 22. The plate 78 is connected to the cathode 84 of the tube 76 by a capacitor 86, and the cathode 84 is also connected to the ground connector. The cathode 84 is also connected to the junction between the half toroid 22 and the capacitor 80 by a capacitor 88. A grid resistor 89 also is connected between the grid 82 and cathode 84. A radio frequency choke 90 is connected between the plate 78 and power supply 92, illustrated in the form of a battery.

As illustrated in Figure 1, the coils 30 of the coil assemblies 24 are designated the control coils for the variable inductors 38*a*, 38*b*, and 38*c*. These coils 30 are connected in a series circuit in parallel with the pulse generator 46. Each pair of coils 32 of the variable inductors 38*a*, 38*b*, and 38*c* are connected in series and designated the direct current bias coils, and these coils are connected in parallel with a direct current source, illustrated as battery 94, through variable resistors 96, 98, and 100, respectively. The third pair of coils 34 of each variable inductor 38*a*, 38*b*, and 38*c* are also connected in series and designated the "swept bias coils," and these coils are connected in parallel with the output of the sweeping pulse generator 46 through variable resistors 102, 104, and 106, respectively.

The variable inductors 38*a*, 38*b*, and 38*c* are provided with trimming condensers 56, 67, and 83 connected in parallel with the serially connected half toroids 20 and 22, respectively. A first step in the tracking procedure for the receiver is to adjust the trimming condensers 56 and 67 to cause the inductances of the variable inductors 38*a* and 38*b* to resonate at the same frequency in the absence of current flowing through any of the magnetic coils 30, 32, or 34 of these variable inductors, and also to adjust the capacitor 83 of the variable inductor 38*c* to cause the variable inductor 38*c* to resonate at a frequency displaced from the frequency of the variable inductors 38*a* and 38*b* by the intermediate frequency of the receiver. The frequency at which these adjustments are made must be below the operating range of the receiver, since a magnetic field passing through the ferrite of the variable inductors will cause the incremental permeability of the ferrite to fall and the frequency of resonance of the tuned circuits to rise. Hence, the next step in the tracking procedure is to adjust the low frequency point for the tuned circuits by adjusting the variable resistors 96, 98 and 100. The direct current flowing through the direct current bias coils 32 of the variable inductors 38*a*, 38*b*, and 38*c* is thus adjusted to fix the incremental permeability of the ferrite to produce the desired inductance of the toroids. Again, the variable inductors 38*a* and 38*b* are tuned to a frequency displaced from that of the variable inductor 38*c* by an amount equal to the intermediate frequency of the receiver. The next step in the tracking procedure is to energize the sweep frequency generator 46. The generator 46 produces a saw tooth pulse which has an initial amplitude of approximately zero. As a result, the saw tooth pulse from the sweep frequency pulse generator 46 does not effect the low frequency point of the tuned circuits. The high frequency point of the tuned circuits is then adjusted by adjusting the variable resistors 102, 104 and 106. The swept bias coils 34 of the variable inductors 38*a*, 38*b*, and 38*c* produce a magnetic flux which when combined with the magnetic flux produced by the control coils 30 and direct current bias coils 32 of these variable inductors lowers the incremental permeability of the ferrite to a sufficient degree to achieve the tracking point for these variable inductors.

The sweep pulse generator 46 includes a saw tooth oscillator 114 and a power transistor 116 with an emitter 118 connected to the output of the oscillator 114. A power source, battery 120, is connected in a series circuit with the coils 30 between the collector 122 and base 124 of the transistor 116. The power transistor 116 has the advantage of being a low impedance high current device, so that the control coils 30 of the variable inductors 38 need not have a high inductance. As a result of this fact, the peak of the saw tooth pulses emerging from the sweeping pulse generator 46 does not build up as high voltages across the coils 30 as when a vacuum tube supplies the pulse. Hence, the voltage breakdown problem is greatly reduced. In addition, the control coils 30 may be serially connected, or connected in parallel to achieve the desired impedance match.

The use of swept bias with the variable inductors makes the variable inductors much more versatile, since it provides a convenient way independent of the control voltages and control coil of the variable inductors for obtaining a high frequency tracking point. Further, the amount of power required to achieve tracking is greatly reduced over a system which would vary the current flowing through the control coils of the variable inductors. The amount of power dissipated by the variable resistors 102, 104 and 106 may be made relatively negligible to that required to achieve the same end with variable resistors positioned either in parallel or in series with the control coils 30.

In one particular construction of the present invention designed to sweep the frequency range from 2.5 megacycles to 18 megacycles, the variable inductors are constructed with a core 10 having a square cross section of approximately ¾ inch by ½ inch. The control coils 30 each consist of 2400 turns of No. 22 wire, the direct current bias coils 32 each consist of 500 turns of No. 32 wire, and the swept bias coils 34 also consist of 500 turns of No. 32 wire. The ferrite ring 18 is constructed of "Ceramic Q" manufactured by General Ceramic Company with an outer diameter of approximately one inch. The half toroids 20 and 22 each consist of nine turns of No. 16 wire wound about the ring 18 which has a cross section of ¼ by ½ inch.

From the foregoing disclosure, those skilled in the art will readily devise many modifications from the structure herein disclosed. It is therefore intended that the scope of the present invention be not limited to the foregoing disclosure, but rather only by the appended claims.

The invention claimed is:

1. An electrical circuit comprising, in combination, a ferromagnetic yoke defining a magnetic circuit with a gap therein, a ferromagnetic member disposed in the gap of the magnetic circuit, a first coil wound about the ferromagnetic member, second, third and fourth coils disposed about the yoke for conducting currents to establish a magnetic flux in the magnetic circuit, a direct current source connected to the second coil, a pulse generator connected to the third and fourth coils, and an impedance connected between the fourth of said coils and the pulse generator.

2. An electrical circuit comprising a ferromagnetic yoke defining a magnetic circuit with a gap therein, a ferrite member disposed in the gap of the magnetic circuit, a first coil wound about the ferrite member, second, third and fourth coils disposed about the yoke for conducting currents to establish a magnetic flux in the magnetic circuit, a direct current source connected to the second coil, a pulse generator connected to the third and fourth coils, and an impedance connected between the pulse generator and the fourth of said coils.

3. An electrical device comprising, in combination, a plurality of stages each containing a variable inductor including a ferromagnetic yoke defining a magnetic circuit with a gap therein, a ferromagnetic member disposed in the gap of the magnetic circuit, a first coil wound about the ferromagnetic member, and second, third, and fourth coils disposed about the yoke for conducting currents to establish a magnetic flux in the magnetic circuit, a direct current source, means to connect the direct current source to the second coil of each of the variable inductors, a pulse generator connected to the third coil of each of the variable inductors, and means to connect the fourth coil of each of the variable inductors to the pulse generator, said means including an impedance between each of the fourth coils and the pulse generator.

4. An electrical device comprising, in combination, a plurality of stages each containing a variable inductor including a ferromagnetic yoke defining a magnetic circuit with confronting parallel surfaces forming a gap therein, a ferrite ring disposed in the gap of the magnetic circuit with opposite sides thereof in contact with the yoke, a first coil wound about the ferrite ring, and second, third, and fourth coils disposed about the yoke for conducting currents to establish a magnetic flux in the magnetic circuit, a direct current source, an impedance connected to each of the second coils of the variable inductors, each second coil and impedance being connected in parallel with the direct current source, a pulse generator connected to the third coil of each of the variable inductors, and a second impedance connected to each of the fourth coils, each fourth coil and second impedance being connected in parallel with the pulse generator.

5. A panoramic receiver comprising, in combination, a mixer stage and oscillator stage each including a variable inductor having a ferromagnetic yoke defining a magnetic circuit with a gap therein, a ferromagnetic member disposed in the gap of the magnetic circuit, a first coil wound about the ferromagnetic member, and second, third and fourth coils disposed about the yoke for conducting currents to establish a magnetic flux in the magnetic circuit, a direct current source connected to the second coil of the variable inductor in the mixer stage through a first impedance and to the second coil of the variable inductor of the oscillator stage through a second impedance, a sweep frequency generator connected to the third coils of the variable inductors in the oscillator and mixer stages, the fourth coil of the mixer stage being connected to the sweep frequency generator through a third impedance and the fourth coil of the oscillator stage being connected to the sweep frequency generator through a fourth impedance.

6. A panoramic receiver including a mixer stage and an oscillator stage, each stage having a variable inductor comprising a ferromagnetic yoke defining a magnetic circuit with parallel confronting surfaces forming a gap therein, a ferrite ring disposed in the gap of the magnetic circuit, a first toroidal coil wound about the ferrite ring, and second, third and fourth coils disposed about the yoke, a direct current source connected to the second coil of the first inductor through a first adjustable impedance and to the second coil of the second variable inductor through a second adjustable impedance, and a sweep frequency generator connected to the third coil of the first and second variable impedances, said swept frequency generator also being connected to the fourth coil of the first variable inductor through a third impedance and to the fourth coil of the second variable inductor through a fourth impedance.

7. An electrical circuit comprising, in combination, a ferromagnetic yoke defining a magnetic circuit with a gap therein, a ferromagnetic member disposed in the gap of the magnetic circuit, a first coil wound about the ferromagnetic member, second, third and fourth coils disposed about the yoke for conducting currents to establish a magnetic flux in the magnetic circuit, a direct current source connected to the second coil, a pulse generator connected to the third and fourth coils, and means connected to the pulse generator for varying the magnitude of the current flowing through the fourth of said coils.

References Cited in the file of this patent

UNITED STATES PATENTS

| | | |
|---|---|---|
| Re. 18,855 | Flehr | June 6, 1933 |
| 2,200,263 | De Kramolin | May 14, 1940 |
| 2,241,912 | Kersten | May 13, 1941 |
| 2,302,893 | Van Roberts | Nov. 24, 1942 |
| 2,601,384 | Goodrich | June 24, 1952 |
| 2,786,940 | Crofts | Mar. 26, 1957 |

OTHER REFERENCES

IRE Transactions—Broadcast and Television Receivers, vol. BTR–1, No. 4, October 1955, pp. 5–9.

Electronics, "Ferrite Inductors Tune Panoramic Receiver," August 1956, pp. 169–171.